United States Patent [19]
Grancoin

[11] 4,084,118
[45] Apr. 11, 1978

[54] SYNCHROTRANSMISSION SYSTEM CONTROLLED BY HALL EFFECT

[75] Inventor: Bernard Grancoin, Paris, France
[73] Assignee: Thomson-CSF, Paris, France
[21] Appl. No.: 698,777
[22] Filed: Jun. 22, 1976
[30] Foreign Application Priority Data
  Jun. 27, 1975   France ................ 75 20399
[51] Int. Cl.² ................................. G05B 11/01
[52] U.S. Cl. ................... 318/138; 318/675; 318/85
[58] Field of Search ............ 318/138, 254, 439, 85, 318/675, 676

[56] References Cited
U.S. PATENT DOCUMENTS

| | | | |
|---|---|---|---|
| 3,891,902 | 6/1975 | Konrad | 318/139 |
| 3,999,108 | 12/1976 | Tanikoshi | 318/138 |

Primary Examiner—Robert K. Schaefer
Assistant Examiner—John J. Feldhaus
Attorney, Agent, or Firm—Cushman, Darby & Cushman

[57] ABSTRACT

A system for the synhchrotransmission of angular position data between two rotating shafts, using, as the transmitter and receiver, two two-phase Hall effect motors, of which each rotor 2, 52 has a permanent magnet and each stator is formed by two windings 54,54, 73,74, and two Hall effect magnetic sensors 3,4, 23,24, arranged in pairs at a right angle. The electrical signals created by the sensors of the transmitter and the receiver are introduced into comparator circuits 19,29 so as to produce, in the event of angular position differences between the rotors, an error signal which after amplification 40, 41 is applied to the windings 53,54 of the receiver, thus eliminating the position difference by the creation of a torque.

7 Claims, 5 Drawing Figures

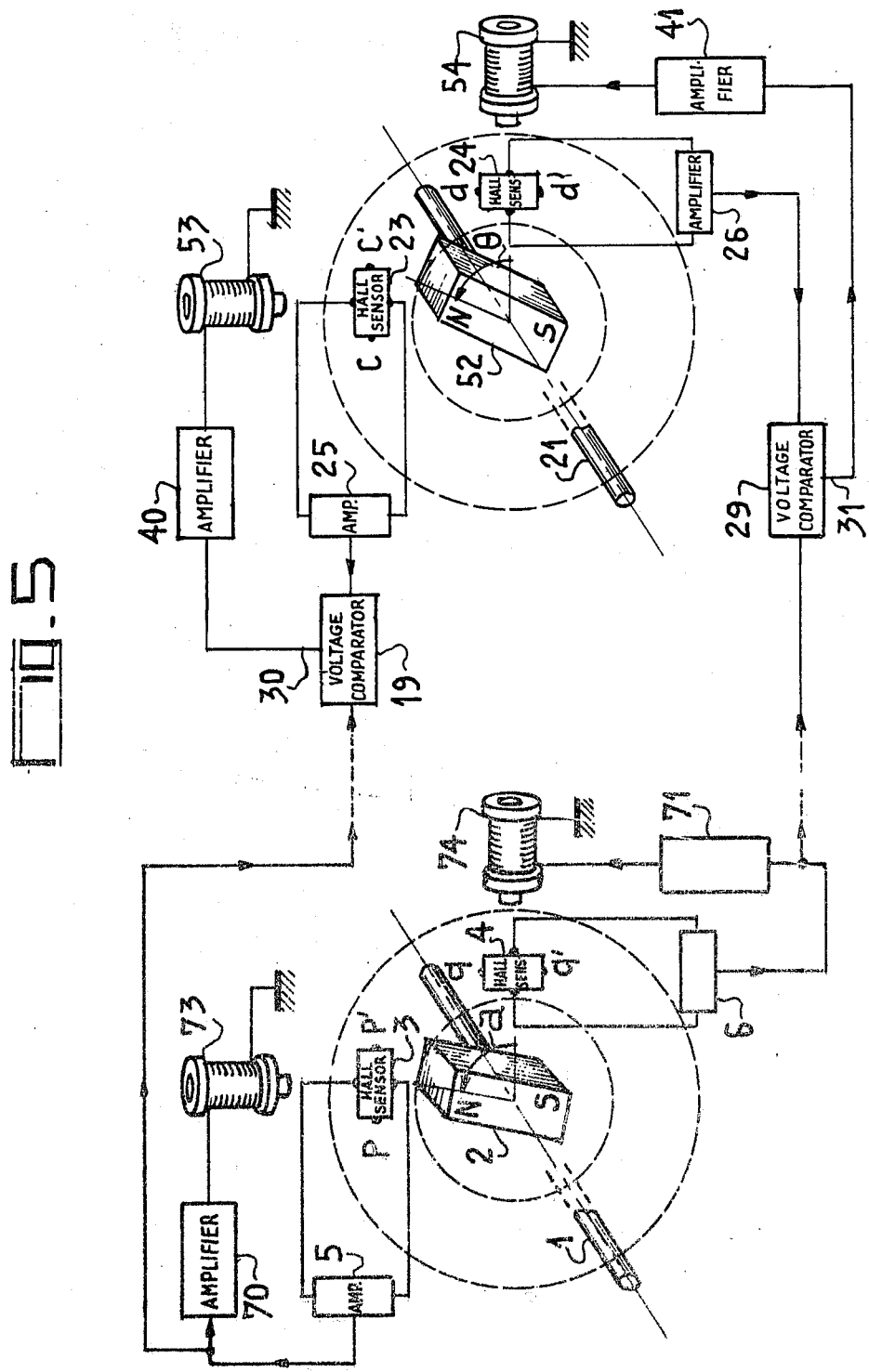

SYNCHROTRANSMISSION SYSTEM CONTROLLED BY HALL EFFECT

This invention relates to the field of systems for transmitting angular position data between rotating axes. In their most simple form, systems of this type comprise a transmitter having a rotating part, of which the angular position represents the data to be transmitted, and a receiver also having a rotating part. Electrical signals, representing its angular position, are produced by the transmitter and are applied either by electrical conductors or lines for their transmission to the receiver where they cause its rotating part to rotate in consistency with the rotating part of the transmitter, thus ensuring the transmission and remote reproduction of an angular position.

Two applications of systems such as these are particularly common: on the one hand, applications where the angular position transmitted and received is directly utilised in the form of an item of information, which constitutes the principle of remote indication, and on the other hand applications where the notion of rotational speed comes into consideration, i.e. applications for which the transmitter and the receiver assume instead the structure of rotary machines of the generator and motor type.

One known solution comprises using an alternator as the transmitter and a synchronous a.c. motor as the receiver. This solution is attended by several disadvantages. First of all, it requires the transmission of the electrical power itself in addition to the position data, which leads to electrical lines of large diameter. Secondly, it has a mechanical torque of zero when rotation of the alternator stops. In that event, the rotating part or rotor of the receiver is situated in a neutral or arbitrary position. It is not possible to obtain synchronism on starting.

Another known solution uses two rotating devices typically referred to in this technical field as "selsyns". Each of them comprises a rotor, having the general structure of a solenoid with an axis perpendicular to the axis of rotation, and a stator which, in certain embodiments, comprises two windings of which the axes extend radially at right angles. The windings of the stators of the two devices are respectively connected together by two transmission lines, whilst the rotors are fed with a.c. electricity of the same frequency.

The rotor of the transmitter creates by induction in the windings a.c. voltages associated with its orientation which, when transmitted to the stator of the receiver, create therein a homologous radial magnetic field with the same orientation. This field applies to the magnetic field of the rotor of the receiver a drive torque of which the effect is to cause their respective directions and senses to coincide. Unfortunately, this system, although effectively ensuring the transmission and reproduction of an angular direction, is attended by several disadvantages:

First of all, the drive torque responsive for orientation is very weak in the vicinity of the actual synchronism position. Typically an angle approaching 90° between the directions of the magnetic fields of the stator and rotor of the receiver is necessary for obtaining a maximum restoring torque.

Secondly, systems of the "selsyn" type use a.c. electricity. Now, it is known that the corresponding magnetic circuits, by comparison with those used in the case of d.c. electricity, show greater losses of energy and result in the adoption of lower average magentic flux values, lower specific torques per unit of mass and, finally, greater volumes and weights for the devices.

In addition, one factor which has to be taken into consideration is that, in the energy balance of the transmission system, it is necessary in order to ensure synchronism permanently to maintain the alternating magnetic fields of the stators and rotors at their nominal value which means that these rotors have to be continuously fed at their operating power and is a particularly troublesome source of reduction in performance.

Finally, the fact that electricity is supplied to the rotors means that they have to be equipped with circular rings cooperating with fixed brushes which represent elements that might give rise to problems of reliability and increase costs.

The present invention does not have any of the disadvantages of the known systems described above.

In principle, the system according to the invention uses two permanent magnets which are respectively integral with two rotating axes at the transmitting and receiving ends, and its fundamental characteristic is that it makes the comparison between the respective electrical signals emanating from two sets of fixed magnetic sensors respectively subjected to the magnetic fields of these magnets. The differences between the signals, caused by a possible angular displacement, or displacement signals, are amplified and utilised for controlling a motor which rotates the axis of the receiving end until the differences between the signals have disappeared and hence until the angular displacement has disappeared.

Unlike the known system described earlier on, the system according to the invention thus constitutes a genuine control system where any difference between the state of the receiver relative to the state of the transmitter produces an error signal which is applied to the receiver in order to re-establish identity between these states.

A second characteristic of the invention is embodied in a particularly advantageous choice of the number of geometric distribution of the magnetic sensors subjected to the magnetic fields of the rotating magnets. Use is made in the transmitter and in the receiver, respectively, of a pair of magnetic sensors arranged at an angle of 90° relative to each of the two respective axes.

The advantage of such a choice are embodied in particular in the fact that the signals created by such an arrangement of sensors are directly proportional to the trigonometric lines, the sine and cosine, respectively, of the angles accounting for the angular position of the transmitter and receiver axes.

Control of the motor which rotates the receiver axis in order to cancel out the angular displacement is thus advantageously simplified by the choice of a two-phase synchronous motor incorporating a permanent magnet. It is thus possible directly to feed the two windings of the stator of such a motor, which are oriented at right angles, with the angular displacement signals emanating from the comparison defined earlier on.

More precisely, the invention relates to a synchrotransmission system controlled by Hall effect, comprising a transmitter provided with a first stator and with a first rotor 2 integral with a first rotating shaft 1 of which the angular position is to be transmitted, and a receiver provided with a second stator and with a second rotor 22 integral with a second rotating shaft 21, distinguished by the fact that, on the one hand, said rotors each comprise a permanent magnet 22 of which the magnetic axis is perpendicular to the direction of their respective axes, whilst said stators each comprise a plurality of Hall effect magnetic sensors 3, 4, 23, 24, subjected to the respective magnetic fields of said rotors, and by the fact that, on the other hand, each plurality of sensors of the first stator and of the second stator is respectively connected to one of the two comparison input terminals of a plurality of comparator circuits 19, 29, the output terminals of these circuits being respectively connected to a plurality of control amplifier circuits 40, 41 ensuring the correct operation of an electric motor 52, 53, 54 of which the axis of rotation coincides with said second rotating shaft.

The invention will be better understood from the following description in conjunction with the accompanying drawings, wherein:

FIG. 5 shows a second variant of that embodiment.

FIG. 1 shows a first embodiment of the synchrotransmission system according to the invention.

Figure 1:
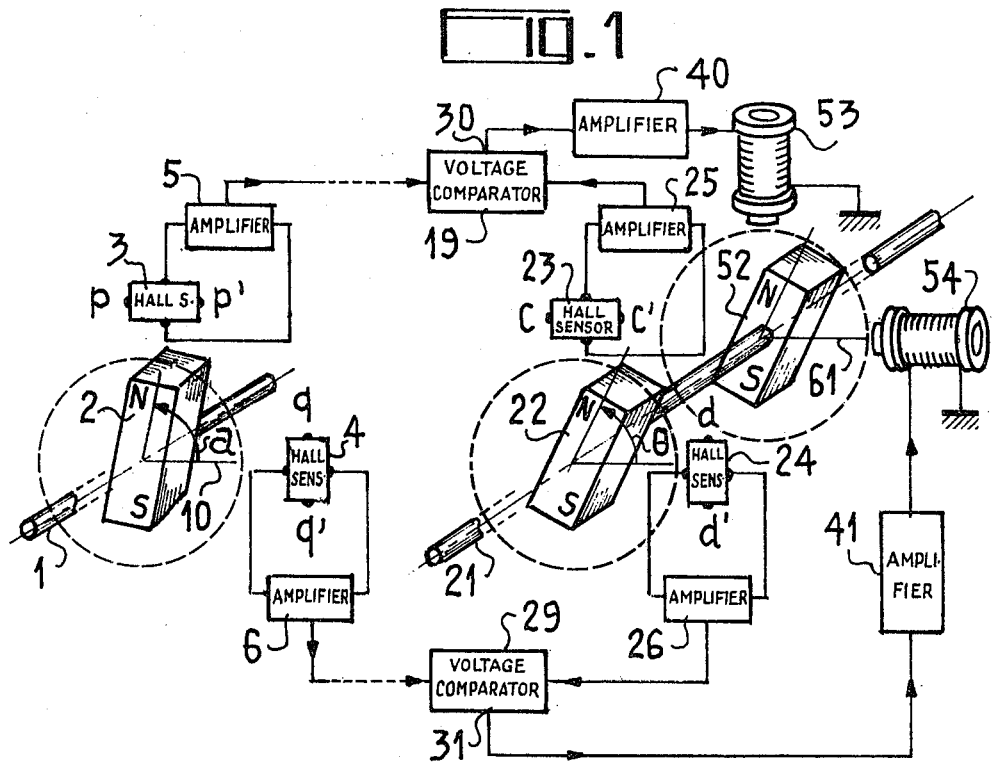
FIG. 1 shows one embodiment of the system according to the invention.

The system comprises a transmitter consisting of a permanent magnet 2 fixed perpendicularly to the rotating shaft 1, whose angular position it is desired to transmit, and of two magnetic sensors 3 and 4 arranged at a right angle to one another relative to the axis of rotation 1. These sensors which, in the embodiment under discussion, are of the so-called "Hall effect" type, are respectively connected to two amplifiers 5 and 6. An auxiliary current is applied to them through terminals $pp'$ and $qq'$ by a source of electricity (not shown). When the shaft 1 turns about its axis through an angle $a$, as measured in relation to an initial direction 10, it carries the magnet 2 through the same angle. The magnetic field of the magnet 2 causes electrical d.c. voltages to appear in the two sensors 3 and 4, these voltages being proportional to the components of said field which they respectively traverse.

As a result of the arrangement at a right angle of the sensors 3 and 4, these components are respectively proportional to the orthogonal trigonometric lines of the angle $a$, i.e. of sine $a$ and cos $a$.

On the other hand, the system according to the invention comprises a receiver including a rotating receiver shaft 21 of which the angular position is to be the reproduction of that of the rotating transmitter shaft 1 and to which a permanent magnet 22 is perpendicularly fixed, and two magnetic sensors 23 and 24 arranged at a right angle to one another relative to the axis of rotation 21. These sensors, which are also of the Hall effect type, are connected to two amplifiers 25 and 26. An auxiliary current is applied to them through terminals $cc'$ and $dd'$ by an electrical source (not shown). When the shaft 21 is in an angular position $\theta$ relative to an initial direction 60, the sensors deliver under the same conditions as described above two d.c. voltages proportional to the orthogonal trigonometric lines of that angle, i.e. sine $\theta$ and cos $\theta$.

The output terminals 17 and 18 on the one hand and 27 and 28 on the other hand of the four amplifiers of the sensors 3, 4, 23 and 24 are respectively connected to 2 voltage comparison circuits 19 and 29. At their output terminals 30 and 31, these circuits deliver two electrical signals of which the values and the signs are associated with the difference in the angular positions of the shafts 1 and 21.

These electrical signals, which have already been referred to as displacement signals in the interests of convenience, are respectively proportional to the differences (sine $a$ - sine $\theta$) and (cos $a$ - cos $\theta$) and both cancel one another out when the angular positions of the shafts 1 and 21 are the same, which corresponds to $a = \theta$.

This result may be achieved by the action of a motor driving the receiver shaft of which the direction of rotation is controlled by the displacement signals through conventional control circuits.

According to the invention, a particularly advantageous choice for the motor is that of a motor of the two-phase synchronous type.

This type of motor comprises a rotor, in the form of a permanent magnet 52, and a stator formed by two windings 53 and 54 arranged radially at 90° around the rotor.

In order to obtain rotation, the two windings have applied to them two electrical voltages respectively determining two perpendicular radial magnetic fields of which the composition creates a radial magnetic field forming an angle of any desired value relative to an initial direction 61 by a suitable choice of the two voltages applied.

In the case of the present invention, this result is achieved by the electrical displacement signals emanating from the comparison circuits 19 and 20 which are applied to the two windings 53 and 54 through the amplifiers 40 and 41.

In operation, any difference between the angular positions of the shafts of the transmitter and receiver determines the creation of two displacement signals which, after amplification and application to the two windings of the two-phase motor, result in the generation of a restoring torque of which the value is associated with the angular difference to be eliminated. The result of this is that the rotor rotates until this angular difference has disappeared.

Accordingly, the angular position of the receiver shaft is always subordinate to that of the transmitter.

In addition, the choice of a single receiver is by no means the only choice and it is possible for a plurality of receivers to be subordinated to a single transmitter.

Figure 2:
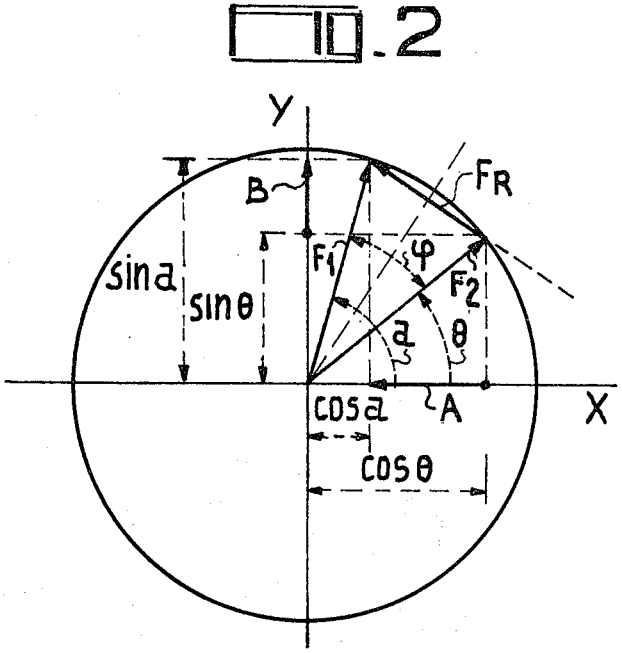
FIG. 2 shows a first explanatory diagram.

FIG. 2 shows an explanatory diagram which, in the two-phase motor, accounts for the value and the direction of the force creating the restoring torque for correcting the angular difference.

The composition in terms of value and direction, at the output of the two comparator circuits, of the signals created by the rotors of the transmitter and receiver are shown on a trigonometric circle with axes OX and OY.

The flux $F_1$ of the transmitter, with an orientation of angle $a$, creates in the magnetic sensors signals proportional to sine $a$ and cos $a$ recorded on the axes OX and OY. Similarly, the fluxes $F_2$ of the receiver, with an orientation of angle $\theta$, differing from that of the transmitter by the angle $\phi$, creates in the magnetic sensors signals proportional to sine $\theta$ and cos $\theta$ which are also recorded on the axes OX and OY. Accordingly, after they have passed through the comparator, the signals which are applied to the windings of the motor are proportional to the segments A and B, creating there the magnetic flux $F_R$ by composition between the two segments.

This flux determines there a force $f$ which is proportional to it and has the same orientation and concerning which it is important to point out that it is substantially perpendicular to the direction $\theta$ of the permanent magnet of the receiver. This characteristic provides for a maximum restoring torque for a value $F_R$ of the given flux, and by comparison with a synchrotransmission system of the "selsyn" type, provides for the generation of a maximum restoring torque for a small displacement angle $\phi$, typically of the order of only about 15°.

Figure 3:
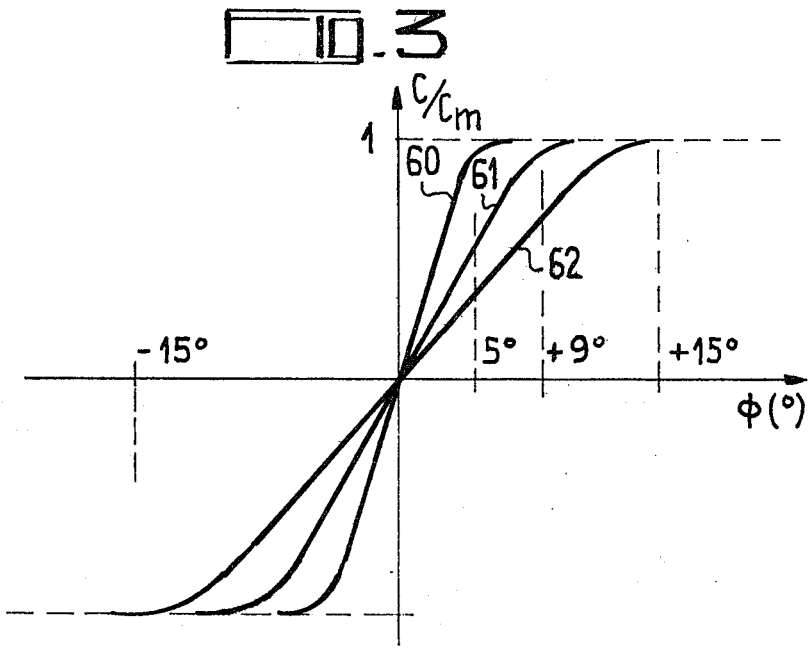
FIG. 3 shows a second explanatory diagram.

FIG. 3 shows a diagram illustrating another advantageous characteristic of the invention, namely the utilisation of an amplification of the electrical displacement signals.

If G is the gain of each amplifier 40 and 41, the force of the restoring torque which is associated with the angular difference $\phi$ between the two rotors at the transmitting and receiving ends will be multiplied by this factor G and this force $f$ will thus be proportional, in accordance with the geometric data of FIG. 2, to:

$$f = k\, G \times 2 \sin(\phi/2) \qquad (1)$$

where $k$ is a proportionality constant. This relation (1) is simplified in the vicinity of the synchronism where $\phi$ is small in accordance with the following relation:

$$f = k\, G\, \phi \qquad (2)$$

This relation (2) clearly shows on the one hand the linear proportionality between the force $f$ of the restoring torque and the displacement angle $\phi$, and on the other hand the role of the gain G of each amplifier which will now be demonstrated with reference to the diagram in FIG. 3.

FIG. 3 shows a graph with axes of cartesian co-ordinates where the displacement angle $\phi$ is recorded on the abscissa, whilst the torque C generated by the motor in relation to the maximum torque $C_m$ which it is able to generate before saturation of the amplifiers 40 and 41 is recorded on the ordinate.

The curves such as 60, 61 and 62 thus represent the variations of $C/C_m$ as a function of $\phi$ which it is possible to express in the form of the relation (3), $C_m$ having a fixed value and C being proportional to $f$:

$$C/Cm = k'\, G\, \phi \qquad (3)$$

where $k'$ is a proportionality coefficient.

Accordingly, the gradient of these curves is governed by the gain G of each amplifier, and the graph clearly shows that, the higher this gain, for example for three values $G_1$, $G_2$, $G_3$, the smaller the displacement angle $\phi$ for which the maximum restoring torque is reached before saturation of the amplifiers, typically 15°, 9° and 5°. Accordingly, the restoring torque of the system according to the invention always has the same maximum value, whereas the displacement angle at which this value is reached may thus be freely reduced, which affords the possibility of greater angular precision, if required, by the choice of a high gain G.

Figure 4:
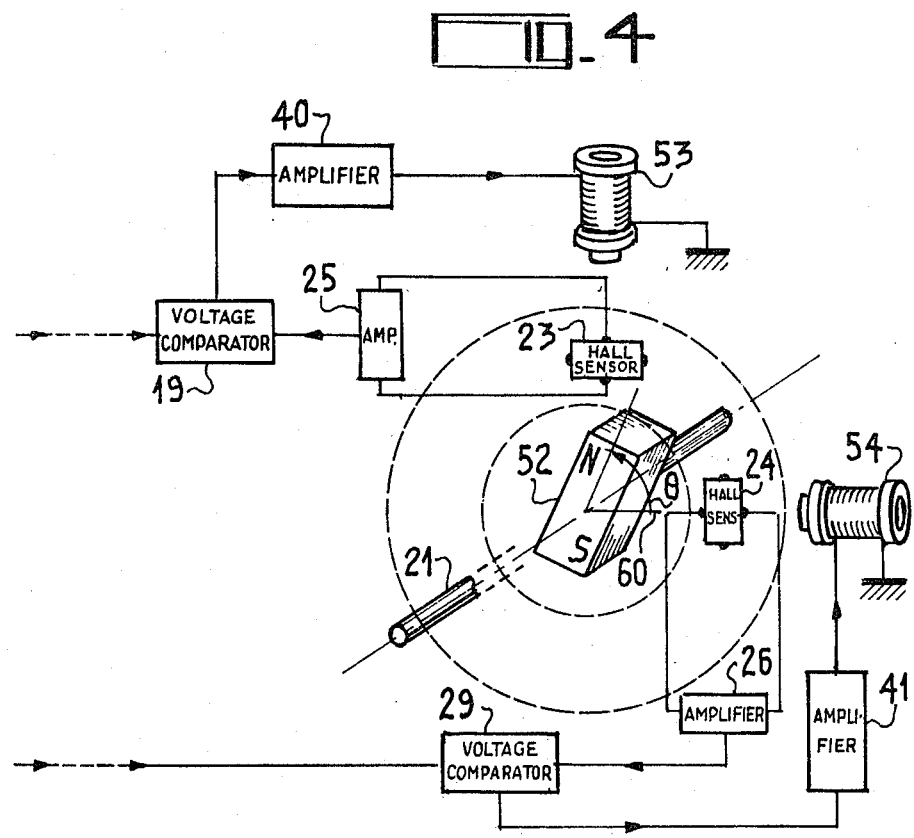
FIG. 4 shows a first variant of the embodiment illustrated in FIG. 1.

FIG. 4 shows a variant of the receiver of the synchrotransmission system. In this variant, the receiver and the motor are combined into a single unit by the advantageous choice, for the two-phase permanent magnet motor, of a motor of the so-called Hall effect type.

A motor such as this simultaneously comprises the windings 53 and 54 of FIG. 1 and the magnetic sensors 23 and 24 of that Figure arranged at a right angle about a permanent magnet rotor.

It is thus possible to ensure that this rotor performs both the function of detecting angular position by acting on the sensors, and the function of controlling the rotation of the shaft of the receiver.

FIG. 5 shows another variant of the synchrotransmission system according to the invention. In this variant, the transmitter is in the form of a two-phase permanent magnet motor of the so-called Hall effect type. The reason for this is that certain applications of synchrotransmission involve the transmission of a rapid rotational movement, such as that of an electric motor.

The choice of a Hall effect motor as the motor of the transmitter has the advantage of also commanding an assembly consisting of the rotor and the magnetic sensors of the motor, which may be made to perform both the function of commutation of the windings of the motor of the transmitter and the function of providing information on the angular position of the rotor, the signals of the sensors being applied, as already explained, to the comparator circuits 19 and 29 of the synchro-transmission system.

The synchrotransmission system according to the invention has been described with reference to a two-phase structure in a 90° distribution of the elements. However, an embodiment of the three-phase or polyphase type is also possible within the context of the invention.

In one typical embodiment of the system according to the invention, the weight of a transmitter or receiver is of the order of one third of the weight of a "selsyn" system of comparable torque.

Of course the invention is not limited to the embodiment described and shown which was given solely by way of example.

I claim:

1. An angular position transmission system between two rotating shafts, comprising a transmitter, provided with a first stator and with a first rotor integral with a first rotating shaft, of which the angular position is to be transmitted, and a receiver provided with a second stator and with a second rotor integral with a second rotating shaft to which said angular position is to be transmitted, said rotors each comprising a permanent magnet of which the magnetic axis is perpendicular to the direction of their respective axes of rotation, and said stators each comprise a plurality of Hall effect magnetic sensors of said rotors, a first one of said sensors of the first stator and of the second stator each being respectively connected to one of the two comparison input terminals of a first comparator circuit and a second one of said sensors of the first stator and of the second stator being each respectively connected to one of the comparison inputs of a second comparator circuit, the output terminals of these circuits being respectively connected to a plurality of control amplifier circuits controlling an electric motor driving said second rotating shaft, to maintain said first and second shafts in synchronous positions.

2. An angular position transmitter system as claimed in claim 1, wherein each of said pluralities is equal to 2, said Hall effect magnetic sensors being distributed on each stator, forming a right angle of which the apex is situated on the corresponding axis of rotation.

3. An angular position transmission system as claimed in claim 2, wherein said electric motor consists of a permanent magnet rotor of which the magnetic axis is perpendicular to the direction of its axis of rotation, and of a stator comprising two windings distributed to form a right angle of which the apex is situated on the axis of rotation of the rotor, each winding being respectively connected to the output terminals of said amplifier circuits.

4. An angular position transmission system as claimed in claim 1, wherein said first rotating shaft is integral with the axis of rotation of another electric motor.

5. An angular position transmission system as claimed in claim 4, wherein said other electric motor is a motor of the two-phase Hall effect type consisting of a permanent magnet motor rotor of which the magnetic axis is perpendicular to the direction of its axis of rotation, and of a stator comprising on the one hand two windings and on the other hand two Hall effect magnetic sensors, the windings and the sensors being respectively distributed to form a right angle of which the apex is situated on the axis of rotation of the motor.

6. An angular position transmission system as claimed in claim 5, wherein said Hall effect magnetic sensors of the first stator are formed by those of the stator of said other Hall effect motor.

7. An angular position transmission system as claimed in claim 5, wherein said second rotor is formed by said motor rotor.

* * * * *